Patented June 6, 1944

2,350,592

UNITED STATES PATENT OFFICE 2,350,592

ALKALINE CLEANING COMPOSITION

Ais J. Comaschi, Kansas City, Mo., assignor to Campbell - Taggart Research Corporation, Kansas City, Mo., a corporation of Missouri No Drawing. Application November 23, 1942, Serial No. 466,665

3 Claims. (Cl. 252—135)

This invention relates to detergents for cleaning metal ware of zinc, aluminum or tin or metal ware plated with zinc, tin or aluminum, the invention relating more particularly to an inhibited alkaline compound for cleaning food containers, such as baking tins and the like, wherein it is desirable that said containers be cleaned without deleterious action, such as corrosion, dissolution, "spangling" or checking of the containers, coatings or the oxide that forms a coating on the container.

Many alkaline detergents have been used for cleaning metal surfaces and it is well known that metals, such as tin, zinc and aluminum, are easily discolored or etched by common alkaline detergents. Tin is further subject to a corrosive action termed "spangling" which is a crystalline growth on the surface of the metal. Heretofore, many additional agents have been used to inhibit the deleterious or corrosive action of alkaline detergent compounds and while some of the inhibitors have been used with success in preventing the deleterious effects of alkalis on soft metal, they have not been wholly successful in preserving the desired surface on the cleaned pans, nor have they been wholly successful in preventing injurious action on the hands of the user.

Baking tins are probably the most difficult to clean of all tin ware because of the type of surface required. New baking tins present a bright polished surface, but such a surface is not desirable because it acts as a reflective insulator which retards baking or causes the baking to be uneven. New tin ware used in commercial baking is usually, therefore, subjected to a heat treatment which forms a "burned on" coating over the surface giving it a "blue-tannish-brown" color which gradually darkens somewhat with use. This coating is a tin oxide which enables the tin to absorb more heat during the baking process and results in a more uniformly baked product. In the cleaning of these utensils, it is necessary for the alkaline detergent to be inhibited to not only prevent corrosion or "spangling" of the metal itself, but to prevent removal of or deleterious effects upon the tin oxide coating. Another disadvantage of some inhibited detergents for treating such vessels, is that, with use, the solutions thereof do not remain stable and the inhibiting qualities become dissipated, thus allowing the solutions to become corrosive and causing damage to the baking tins and thin coatings, and thus requiring constant watchfulness, periodic testing and fortification with fresh quantities of compounds. In other detergents, the immersion time in a solution thereof is critical and slight variation in said immersion time results in either a dirty pan or one in which the tin oxide coating is damaged.

The objects of the present invention are to provide a cleaning compound for removing oil, grease or fat, burned flour, dough particles, et cetera, without deleterious effects upon the plated metal ware or the oxide coating thereon; to provide a cleaning compound in which the immersion time in suitable solutions thereof is not critical and in which utensils to be cleansed therewith may be immersed for an indefinite period in suitable boiling solutions thereof without deleterious, corrosive or "spangling" action on the metal or oxide coating; to provide a cleaning compound that remains stable in washing solutions and presents little variation in cleaning strength and corrosive action during long periods of use; to provide a cleaning compound which acts in suitable solutions to saponify the grease removed from the pans being cleaned; to provide a cleaning compound that may be stored indefinitely in a dry or solid form for subsequent addition to water to form a cleaning bath; and to provide a convenient, economical and efficient detergent of the character noted.

In accomplishing these and other objects of the present invention, I have found that suitable compounds of corrosive alkaline reacting detergents, such as sodium metasilicate and sodium silicates, retain their alkalinity or corrosive qualities when mixed separately with a compound selected from the group consisting of sodium bicarbonate, sodium acid phosphate and sodium acid sulfate, but that they may be mixed together and that the compound is then inhibited by the addition of sodium bicarbonate, sodium acid phosphate and sodium acid sulfate.

While solutions of this inhibited compound quickly clean baking tins and the like, the outside tin coating is not damaged and a solution of the compound possesses more stability than any other buffered or inhibited alkaline detergent now known to me.

Sodium metasilicate ($Na_2SiO_3 \cdot 5H_2O$) is used in many detergents and in itself is corrosive to tin bake pans and oxide coatings thereon. Sodium silicate ($Na_2O:3.22SiO_2$) has the same action to a lesser degree. When a compound is prepared of sodium metasilicate and sodium silicate ($Na_2O:3.22SiO_2$), it is also corrosive and removes the oxide coating from the pans. The same is true when mixtures of sodium metasilicate and sodium bicarbonate (NaHCO₃), or sodium silicate (Na₂O:3.22SiO₂) and sodium bicarbonate are used. Sodium bicarbonate by itself, is not effective in cleaning grease and other soil from the pans, but when combined with a mixture of sodium metasilicate and sodium silicate (Na₂O:3.22SiO₂), as in the present compound, the sodium bicarbonate acts as an inhibitor to the reaction between the cleaning constituents of the compound and the tin oxide coating, thereby allowing the compound to remove the grease and other particles satisfactorily and retain the oxide coating on the pans.

Sodium acid phosphate (NaH₂PO₄) and sodium acid sulfate (NaHSO₄), in approximately the same proportions as the sodium acid carbonate, may sometimes be substituted for the sodium acid carbonate with good results.

Various silicates of soda have been compounded with other compounds of soda and other alkalis, but not two forms of sodium silicate, wherein one is of low alkali ratio and the other of high alkali ratio. Since neither of the sodium silicates are affected separately by the addition of sodium bicarbonate, it is believed the low alkali ratio silicate in the compound reacts with the sodium bicarbonate to enhance the inhibiting action thereof. The sodium metasilicate, being of larger proportion in the compound, probably functions strictly as a detergent. It is also believed that the reaction in the compound makes the silicate more siliceous, thereby giving more protection to the metal and oxide coating than would normally be obtained with a solution, which, it is believed, should have a hydrogen ion concentration (pH) of about 10.

My new cleaning compound may be and preferably is produced in the following manner:

50 to 60 parts by weight of sodium metasilicate (1Na₂O:1SiO₂) is placed in a mixer. 20 to 30 parts by weight of sodium bicarbonate, and 20 to 30 parts by weight of sodium silicate (Na₂O:3.22SiO₂)

are added to the sodium metasilicate to make up the dry ingredients of the cleaning compound. Mixing of these compounds is preferably in a power mixer in which the crystals are carefully guarded against collection of moisture. If the above mechanical mixture is not desired, the cleaning compound may be prepared in a mixed crystalline form as follows:

The ingredients are heated together sufficiently to melt the crystals of all the ingredients. After proper agitation the melt is poured into trays and allowed to cool and solidify. The cooled solid compound is then removed from the mixer and crushed or ground into a powder and stored in bags, preferably waterproof, until time for use.

The preferred formula of the cleaning compound, in parts by weight, may be as follows:

| | Per cent |
|---|---|
| Sodium metasilicate | 50–60 |
| Sodium bicarbonate | 20–30 |
| Sodium silicate (Na₂O:3.22SiO₂) | 20–30 |

In using the present formula it is preferable that a solution be formed which includes approximately from 1% to 5% of the cleaning compound mixed or stirred into water, a suitable commercial quantity of the solution being about 500 gallons. The solution may be heated to the boiling temperature and metal ware, such as baking tins or the like, are then immersed therein. The temperature and the immersion time are not critical for the reason that many hours of exposure in the hot solution does not cause any deleterious effect on the metal or the oxide coating thereon, but all of the grease, dirt, burned flour, or dough particles are removed.

The solution is stable and use of it does not increase the alkalinity or corrosive action, even under prolonged periods of time at boiling temperatures. Regardless of the length of time the solution is used, even when it becomes too dirty for further use, the inhibiting action remains the same. The only difference in the cleaning of subsequent batches of pans is that a slightly longer immersion time is required to properly clean the grease from the surface. In actual commercial use, the time of immersion is gradually increased and is preferably doubled after over 400 pans, for example, are cleaned. It is not necessary to provide the chemicals as a mixture, as a similar result can be obtained by the use of separate chemicals and mixing them in the washing solution. More uniform results are obtained, however, when the compound is mixed as described.

The present invention has the further advantage of being effective in vessels made of metal materials and in vessels of wood, glass, porcelain or silica, or vessels lined with such materials.

While I have described my invention in but one form, it will be apparent that it is not so limited, but is susceptible to changes and modifications without departing from the spirit thereof and such modifications are contemplated as falling within the scope of the appended claims.

What I claim and desire to secure by Letters Patent is:

1. A metal oxide corrosion inhibiting composition for forming cleaning baths for metal ware with tin surfaces having tin oxide coatings and with aluminum surfaces having aluminum oxide coatings comprising the following ingredients in approximately the proportions by weight given:

| | Parts |
|---|---|
| Sodium metasilicate | 50 to 60 |
| Sodium bicarbonate | 20 to 30 |
| Sodium silicate (Na₂O:3.22SiO₂) | 20 to 30 |

2. A metal oxide corrosion inhibiting composition for forming cleaning baths for metal ware with tin surfaces having tin oxide coatings and with aluminum surfaces having aluminum oxide coatings comprising, sodium metasilicate 50 to 60 parts, sodium silicate (Na₂O:3.22SiO₂) 20 to 30 parts, and 20 to 30 parts of a material selected from the group consisting of sodium acid phosphate, sodium acid sulphate and sodium bicarbonate, all of said parts being by weight.

3. A metal oxide corrosion inhibiting alkaline cleaning bath for metal ware with tin surfaces having tin oxide coatings and with aluminum surfaces having aluminum oxide coatings comprising water, and one to five per cent (1 to 5%) of a mixture consisting of the following ingredients in approximately the proportions by weight given:

| | Parts |
|---|---|
| Sodium metasilicate | 50 to 60 |
| Sodium bicarbonate | 20 to 30 |
| Sodium silicate (Na₂O:3.22SiO₂) | 20 to 30 |

LOUIS J. COMASCHI.